United States Patent

[11] 3,574,312

[72] Inventor  Joseph T. Miller
       St. Louis, Mo.
[21] Appl. No. 802,131
[22] Filed  Feb. 25, 1969
[45] Patented  Apr. 13, 1971
[73] Assignee  Sinclair & Rush Inc.
       St. Louis, Mo.

[54] CLOSURE
1 Claim, 5 Drawing Figs.

[52] U.S. Cl. .................................................. 138/96,
       220/24.5, 138/89
[51] Int. Cl. ...................................................... F16l 57/00,
       B65d 59/06
[50] Field of Search .......................................... 138/96, 96
       (T), 89; 220/24.5

[56] References Cited
UNITED STATES PATENTS

| | | | |
|---|---|---|---|
| 1,934,681 | 11/1933 | Damsel | 138/96 |
| 2,930,409 | 3/1960 | Higgins | 138/96 |
| 2,551,834 | 5/1951 | Ferguson | 138/96 |
| 2,580,762 | 1/1952 | Grenier et al. | 138/96X |
| 2,873,765 | 2/1959 | Gregory | 138/96 |
| 3,104,681 | 9/1963 | Gray, Jr. | 138/96 |
| 3,200,984 | 8/1965 | Fueslein et al. | 220/24.5 |

*Primary Examiner*—James Kee Chi
*Attorney*—Gravely, Lieder & Woodruff

ABSTRACT: A closure formed from a material of relatively high flexibility and elasticity and having a sidewall defining a socket which is closed at one end by an integrally formed end wall. The closure may be utilized either as a plug for insertion in bores or cavities or as a cap for installation over the ends of pipes or rodlike objects.

PATENTED APR 13 1971

3,574,312

INVENTOR

JOSEPH T. MILLER

BY *Gravely, Lieder & Woodruff*

ATTORNEYS

CLOSURE

This invention relates in general to closures and more particularly to closures which are suitable for blocking different types of openings.

In shipping machined parts having exposed threads the danger always exists that the threads will become marred and rendered useless. When the threads represent a port or the end of some fluid conduit on a valve, pump, or other type of fluid-conducting apparatus, the further problem of protecting the interior of the apparatus from airborne contaminants and rust-inducing moisture exists.

Heretofore, plastic closures in the form of plugs and caps have been developed to economically alleviate these problems, but the closures of current manufacture have not entirely solved the problems and have in some instances compounded the problem. For example, most of the closures of current manufacture are molded from polyethylene or polypropylene plastisols, and these plastics are relative hard, possessing at most a moderate amount of flexibility and practically no elasticity. Consequently, when such closures are forced axially across threads, which is the only practical way to install them on a production line basis, the hard plastic tends to shred and create the type of contaminants the closure is supposed to form a barrier against. The shredding, in addition, reduces the effectiveness of the seal formed with the threads. Furthermore, extremely close tolerances must be held in the molding operation to insure that the closure does not fit too loosely, in which case it will fall off of the threads, or too tightly, in which way to case an excessive amount of shredding occurs during installation. In this connection, closures of current manufacture, by reason of their relatively inflexible and inelastic nature must be supplied in a different size for each standard female and male thread, and this, of course, complicates the maintenance of an adequate inventory. For example, to accommodate ⅛-inch, ¼-inch, ⅜-inch, ½-inch, ¾-inch and 1-inch pipe threads of both female and male fittings an inventory of 12 different conventional closures is normally required.

Moreover, the most common plastic closure plug is provided with an outwardly projecting flange which overlies that portion of the structure surrounding the threads into which the plug is inserted. This flange prevents the plug from being inserted to too great a depth, but it also masks a portion of the structure so that when the structure is painted or covered with a protective coating with the plug in place, an unpainted or unprotected ring remains at the surface masked by the plug. This ring can only be eliminated by a subsequent touchup operation.

Finally, by reason of their rigid construction, conventional caps and plugs are difficult to remove so as to expose the threads for subsequent use. Normally, the closure is punctured with a screwdriver and then pried away from the threads. Not only is this a time-consuming operation, but it also produces shreddings and chips which could damage or clog the structure the closure is supposed to protect from contamination. Furthermore, the screwdriver, if manipulated carelessly could mar the thread.

One of the principal objects of the present invention is to provide a single closure which may be utilized either as a cap or a plug. Another object is to provide a closure which does not shred when forced over threads. A further object is to provide a closure which may be easily removed from the opening it closes. An additional object is to provide a closure which forms a secure seal with threads and other surfaces which define openings. Still another object is to provide a closure in the form of a plug which does not mask the structure surrounding the opening into which it is inserted. These and other objects and advantages will become apparent hereinafter.

The present invention is embodied in a closure engageable with generally cylindrical surfaces either as a plug or a cap. The closure has a socket-forming sidewall which is closed by an end wall. The invention also consists in the parts and in the arrangements and combination of parts hereinafter described and claimed.

In the accompanying drawings which form part of the specification and wherein like numerals and letters refer to like parts wherever they occur:

Figure 1:
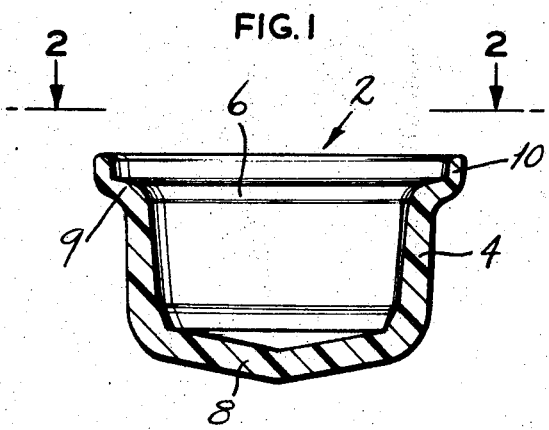
FIG. 1 is a sectional view of a closure constructed in accordance with and embodying the present invention.
Figure 2:
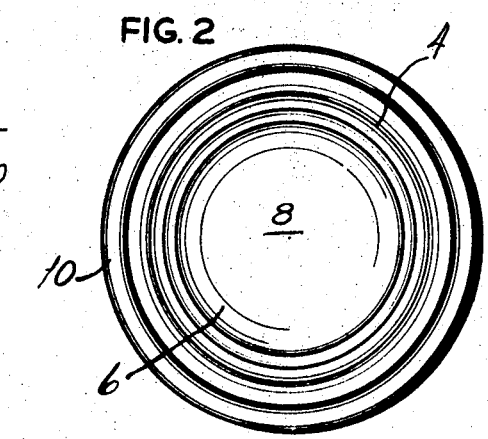
FIG. 2 is a plan view of the closure showing the open end of its socket.

Referring now in detail to the drawings, 2 designates a closure preferably formed from a substance which has a relatively high degree of flexibility and elasticity and resists shredding when fed along threads, knurls or roughened surfaces. Polyvinyl chloride (PVC) is one such substance. The closure 2 integrally includes a circular sidewall 4 (FIGS. 1 and 2) which closes upon itself or in other words is curved about a centerline extending through the center of the closure 2. The curved sidewall forms a socket 6 in the closure 2, and merges at its one end into a domed end wall 8 which closes one end of the socket 6. Both the inside and outside surfaces of the sidewall 4 taper, converging toward the end wall 8, and the taper of the inside is generally slightly greater than the taper of the outside. The diameter of the inner wall is such that it is slightly smaller than a conventional male thread, whereas the diameter of the outer wall is slightly larger than a conventional female thread. Thus, the sidewall 4 is sized for engagement with at least two different types of threads.

At its opposite end, that is, the end opposite the end wall 8, the sidewall 4 merges into an outwardly flared flange 9 and an axially directed lip 10. The outwardly presented surface of the flange 9 is oblique to the outer surface of the sidewall 4 and to the central axis of the closure 2. The lip 10 extends axially from the end of the flange 9.

Figure 3:
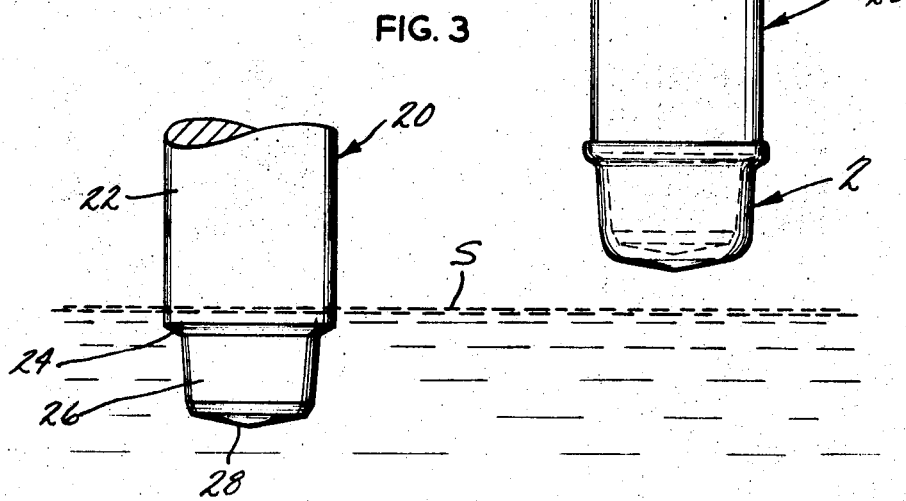
FIG. 3 is an elevational view showing the mandrel used in the dipping operation by which the closure is formed.

Turning now to FIG. 3, the closure 2 is formed by dipping a mandrel 20 into liquid polyvinyl chloride plastisol or some other suitable plastisol, and then removing the mandrel 20 and allowing the coating of polyvinyl chloride to cure into the closure 2. The mandrel 20 includes a shank portion 22 which downwardly terminates at a beveled shoulder 24, the bevel of which corresponds to the bevel of flange 9. The shoulder 24, in turn, merges into a nose portion 26 having a slight taper which is generally equal to the taper of the inner surface on the sidewall 4. The diameter of the nose portion 26 is, furthermore, slightly larger than the diameter of the inner surface on the sidewall 4. The nose portion 26 downwardly terminates at a domed end face 28.

The mandrel 20 is dipped into the liquid polyvinyl chloride plastisol until the tapered shoulder 24 is entirely submerged and the upper surface of the liquid plastisol laps up onto the shank portion 22 along a line S. After a predetermined time the mandrel 20 is withdrawn from the liquid plastisol and the coating adhering thereto is allowed to cure into the closure 2. Upon withdrawal of the mandrel 20 a small amount of polyvinyl chloride tends to run downwardly and accumulate at the lower end of the nose portion 26. This accounts for the fact that the taper of the inner surface of the sidewall 4 on the completed closure 2 is slightly greater than the taper of the outer surface. Once the coating has cured, the closure 2 is peeled off and is ready for use. The diameter and taper of the nose portion 26 of the mandrel 20 is such that the socket 6 of the completed closure 2 will snugly accept a standard male pipe thread. In addition, the elasticity and flexibility of the plastisol, the taper of the mandrel 20, and the temperature of the mandrel 20 are all such that the outer surface of the sidewall 4 will be tapered and sufficient in size to snugly engage the threads of a standard female thread when the closure 2 is forced therein. Thus, one closure 2 may be used on either a standard female or male thread. In this connection, the closure 2 shrinks slightly upon being removed from the mandrel 20, and accordingly, the exact size and taper of the nose portion 26 on the mandrel 20 is calculated to accommodate nominal shrinkage.

Figure 4:
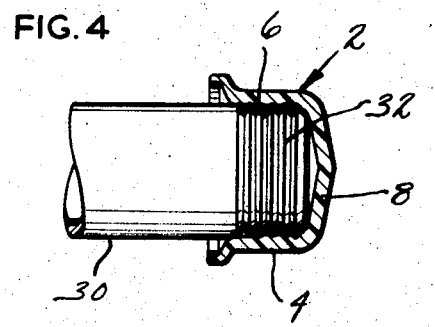
FIG. 4 is a sectional view showing the closure capping a pipe.

In use the closure 2 may be used for capping the end of a pipe 20 (FIG. 4) having external threads 32. In this sort of application the socket 6 is aligned with the threaded end of the pipe 30, and thereafter the entire closure 2 is forced axially along the pipe 30 until the threaded end of the pipe 30 completely fills the socket 6. Since the closure 2 is formed from a flexible and elastic substance its sidewall 4 will expand slightly to accommodate the entrance of the pipe 30. Nevertheless, as the inner surface of the sidewall 4 is forced across the threads 32 no shredding takes place and consequently the threads 32 are not clogged nor are loose shreddings introduced into the interior of the pipe 30. Once installed the closure 2, by reason of its elasticity, tightly embraces the threads 32, forming a fluidtight seal therewith. In time, the material of the closure 2 experiences a slight amount of cold flow, so that the threads 32 actually embed within the sidewall 4, and this makes the seal at the juncture of the two even more secure. Of course, the closure 2 may also be used to cap the ends of pipes or other conduits or even rods which have no threads.

By reason of its flexibility and the presence of the flange 9 and lip 10, the closure 2 is removed from the thread 32 of the pipe 30 as easily as it installed. To remove the closure 2, it is gripped at its flange 9 and lip 10 and either pulled or peeled backwardly off of the end of the pipe 30. Since the lip 10 extends entirely around the end of the sidewall 4 no special positioning of the closure 2 on the pipe 30 is necessary to facilitate easy removal, as is the case with some closures having winglike tabs for effecting removal. Moreover, since the material is flexible the flange 9 and lip 10 will deform in the presence of nearby objects. By reason of the fact that the lip extends axially it will not form an obstruction during packaging operations.

Figure 5:
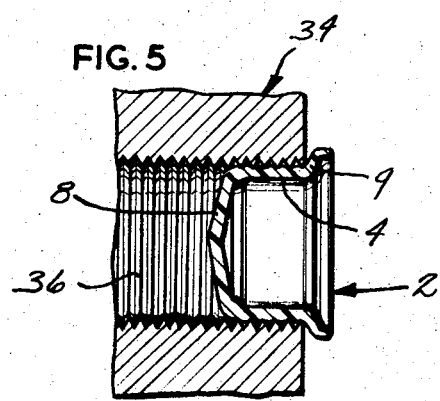
FIG. 5 is a sectional view showing the closure plugging a threaded bore.

The closure 2 may also be used as a plug for blocking a conduit 34 (FIG. 5) having a threaded bore 36. In such an application the sidewall 4 is aligned with and forced into the threaded bore 36 with the end wall 8 of the closure 2 presented forwardly. The advancement of the large closures 2 into corresponding bores 36 may be accomplished by inserting one's thumb or finger into the socket 6 and pressing it against the end wall 8, whereas in smaller sizes it is desirable to use a small rod having a blunt end for this purpose. In either case the application of the axial force to the end wall 8 tends to elongate the sidewall 4 and further increase its taper, thereby effecting easy installation. The closures 2 may also be inserted into the bore 36 by applying the axial force at the flange 9. In smaller sizes this can be accomplished by pushing with the thumb, whereas in larger sizes the flats of the fore and middle fingers should be used. Advancement of the closure 2 into the threaded bore 36 continues until the flange 9 engages that portion of the conduit 34 which surrounds the bore 36.

During the advancement of the closure 2 into the conduit 34 the outer surface of the sidewall 4 passes across the threads of the bore 36 without shredding. Furthermore, once the axial installing force is removed the sidewall 4 tends to expand or back into the threads of the bore 36 forming a tight seal therewith, and this seal is improved during the course of time by the cold flow phenomenon previously mentioned.

Since the flange 9 does not project radially from the sidewall 6, but on the contrary is oblique to the axial centerline of the closure 2, it does not lie flat against the outer surface of the conduit 34 and thereby mask it as is true of the flanges on some conventional plugs. Consequently, the outer surface of the conduit 34 may be painted up to the margin of the threaded bore 36 with the closure 2 in place.

The closure 2 is removed from the bores 36 merely by grasping it along its flange 9 and lip 10 and pulling outwardly.

By reason of the elasticity of the material, a single closure 2 accommodates more than one thread size. Generally speaking, a single closure accommodates the female thread of specific size as a plug and the male thread of that same size as a cap, with some exceptions at smaller sizes. For example, it has been found that a single closure 2 will accommodate both 1-inch NPT female and male fittings as a cap and plug, respectively and the same applies to ¾-inch NPT and ½-inch NPT fittings, only with smaller closures 2. Still a smaller closure 2 will serve as a cap for ¼-inch and ⅜-inch NPT fittings and as a plug for ⅜-inch NPT fittings. Yet another closure 2 will accommodate ⅛-inch NPT male fittings and ¼-inch NPT female fittings. Finally, an even smaller closure 2 may be used as a plug for ⅛-inch NPT fittings. Thus, for the 12 different conventional threads found of pipe fittings between and inclusive of ⅛-inch and 1-inch NPT, an inventory having only six closure sizes is required to close any one of them. The same closures may also be used with other threads of similar sizes, and they are not restricted to pipe threads. For example, the closure 2 which fits female and male 1-inch NPT fittings will also fit male and female standard threads of 1 3/16-inch, 1¼-inch and 1 5/16-inch diameter.

This invention is intended to cover all changes and modifications of the example of the invention herein chosen for purposes of the disclosure which do not constitute departures from the spirit and scope of the invention.

I claim:

1. A protective closure for installation at the end of a generally cylindrical surface; said closure comprising a wall of annular cross-sectional shape and having generally cylindrical inwardly and outwardly presented surfaces, both the inwardly and outwardly presented surfaces being substantially smooth and continuous and each being lip to engage a different generally cylindrical surface of standard size; an end wall connected to and formed integral with one end of the sidewall, the end wall extending across and closing the area circumscribed by the end of the sidewall, whereby the sidewall and end wall form a socket in the closure; a continuous flange connected to and formed integral with the opposite end of the sidewall and extending completely around end of the sidewall, the included angle between the sidewall and the flange being greater than 90° and the flange being presented obliquely with respect to the axial centerline of the sidewall, the flange further being located in its entirety radially beyond the inwardly presented surface of the sidewall, whereby it does not interfere with the insertion of objects into the socket formed by the sidewall; and a lip connected to and formed integral with the flange at the outer end of the flange, the lip extending completely around the flange at the outer end thereof and projecting generally axially away from the end of the sidewall to which the flange is attached, the lip further having its inwardly presented surface located further from the axial centerline that the inwardly presented surface of the sidewall; the closure being formed in its entirety from a flexible elastomeric material so that it deforms easily when subjected to localized forces, said lip being deformable toward the end of said cylindrical surface; the closure further affording protection to generally cylindrical surfaces interchangeably in one of two circumstances, the first circumstance being when the generally cylindrical surface to be protected and closed is engaged by the outwardly presented surface of the sidewall and the end wall serves as a plug, in which case the flange and the lip are spaced from the end of the cylindrical surface and the lip is presented axially outwardly from said end for easy gripping, and the second circumstance being when the generally cylindrical surface to be protected is engaged by the inwardly presented surface of the sidewall and the end wall serves as a cap, in which case the lip will be presented in diametrically outwardly spaced relation to the generally cylindrical surface for easy gripping.

PO-1050 (5/69)

UNITED STATES PATENT OFFICE
CERTIFICATE OF CORRECTION

Patent No. 3,574,312   Dated April 13, 1971

Inventor(s) Joseph T. Miller

It is certified that error appears in the above-identified patent and that said Letters Patent are hereby corrected as shown below:

Column 1, line 30, after "in which" cancel "way to".

Column 2, line 19, after "when" cancel "fed" and substitute "forced".

Column 2, line 47 after "of" insert "the".

Column 4, line 34, cancel "lip" and substitute "sized".

Column 4, line 41, after "around" insert "the".

Column 4, line 54, cancel "that" and substitute "than".

Column 4, line 64 cancel "the" first occurrence.

Signed and sealed this 26th day of October 1971

(SEAL)
Attest:

EDWARD M. FLETCHER, JR.
Attesting Officer

ROBERT GOTTSCHALK
Acting Commissioner of Patents